United States Patent [19]
Crispoldi

[11] Patent Number: 5,435,823
[45] Date of Patent: Jul. 25, 1995

[54] CALCIUM AND MAGNESIUM BASED NITROGEN FERTILIZER, PROCESS AND EQIUPMENT FOR ITS PRODUCTION

[75] Inventor: Antonio Crispoldi, Terni, Italy

[73] Assignee: Terni Industrie Chimiche S.p.A., Nera Montoro, Italy

[21] Appl. No.: 52,057

[22] Filed: Apr. 21, 1993

[51] Int. Cl.$^6$ .................. C05F 5/00; C05F 13/00
[52] U.S. Cl. ...................................... 71/54; 71/58
[58] Field of Search .................... 71/50, 51, 54, 58

[56] References Cited
U.S. PATENT DOCUMENTS 1,916,617  7/1933  Jaenecke et al. ........................ 71/58

FOREIGN PATENT DOCUMENTS 538223  11/1955  Belgium .
849702  9/1952  Germany .
309175  4/1929  United Kingdom ............ 71/58

OTHER PUBLICATIONS

J. Grindrod (May 1958) Engng. & Boiler House Rev., vol. 73(5), p. 155.

Primary Examiner—Ferris Lander
Attorney, Agent, or Firm—Rogers & Wells

[57] ABSTRACT

A fertilizer containing Ca, Mg and $NH_44$, having a water content ranging between 15% and 35% in weight and a melting point ranging between 50 and 65 degrees C is prepared by etching of dolomite and/or limestone with nitric acid, neutralization, concentration and granulation (FIG. 1).

12 Claims, 2 Drawing Sheets

CALCIUM AND MAGNESIUM BASED NITROGEN FERTILIZER, PROCESS AND EQIUPMENT FOR ITS PRODUCTION

BACKGROUND OF THE INVENTION

Field of the Invention

The present invention concerns a calcium and magnesium based nitrogenous fertilizer as well as a process and an equipment for the production thereof.

As known, N, Ca and Mg are essential elements for plants growth. Nitrogen is generally administered as urea or ammonium nitrate ($NH_4NO_3$) or also together with phosphorus and/or potassium in the so-called binary or ternary fertilizers; calcium is administered as "calcareous fertilizer" to prevent its washout from the soil or also in basic forms (e.g. CaO) when adjustment of soil pH is required.

Another known form of calcium containing fertilizer is calcium nitrate, $Ca(NO_3)_2$, in hydrate and deliquescent form.

Magnesium is administered for instance as mixed potassium and magnesium sulfate.

A disadvantage of the known fertilizing compounds lies in the fact that not all are mixable with each other: for example, ammonium nitrate is not mixable with lime and can be mixed with potassium and potassium-magnesium sulfate only just before the use.

This means that at present there is no fertilizer available that contains and allows to administer simultaneously known amounts of N, Ca and Mg and that is free from storing problems and easily administrable, and wherein the aforementioned nutritional elements are in water-soluble form, rapidly effective.

OBJECTS OF THE INVENTION

An object of the present invention is to overcome the drawbacks of known fertilizers by means of a Ca and Mg based nitrogenous fertilizer provided with the aforesaid physico-chemical properties.

A further object of the invention is to provide a process for the production of said fertilizer.

A further object of the invention is to provide an equipment to run this process.

Said objects are achieved by means of the present invention that concerns a nitrogenous fertilizer, characterized in that it comprises the following compounds: water, calcium nitrate, magnesium nitrate.

The invention moreover concerns a process for the production of a calcium and magnesium base nitrogenous fertilizer, characterized in that it comprises the following steps:

preparing an aqueous solution containing calcium nitrate and magnesium nitrate by treatment with nitric acid of inorganic materials containing said elements;

bringing, if necessary, said solution to a substantially neutral pH;

concentrating the solution thus obtained to a total water content ranging between 15% and 35% in weight; and solidifying by cooling said concentrated solution in atmosphere with controlled hygrometric degree.

A further object of the invention consists in an equipment for the production of a nitrogenous fertilizer characterized by the fact of comprising the following serially connected components: one or more reactors for nitric acid treatment of inorganic materials containing Ca and/or Mg;

a neutralizing reactor controllably connectable with an ammonia source and a source of nitric acid;

a concentrator; and a granulator.

SUMMARY OF THE INVENTION

According to a preferential feature of the present invention treatment with $HNO_3$ is performed on dolomite, a mineral with formula $CaMg(CO_3)_2$, and possibly on limestone, addition to the solution thus obtained of more nitric acid and ammonia is performed up to neutral pH and granulation of the concentrated neutral solution is finally carried out.

A Ca-Mg based nitrogenous fertilizer is thus obtained at reduced costs with optimal characteristics of hardness and flowability, with reduced hygroscopicity and devoid of the tendency to free fine powders during storage and/or distribution on soils.

The invention will be now described more in detail with reference to the accompanying drawings given for illustrative and non-limiting purposes, where:

DESCRIPTION OF THE PREFERRED EMBODIMENTS

Figure 1:
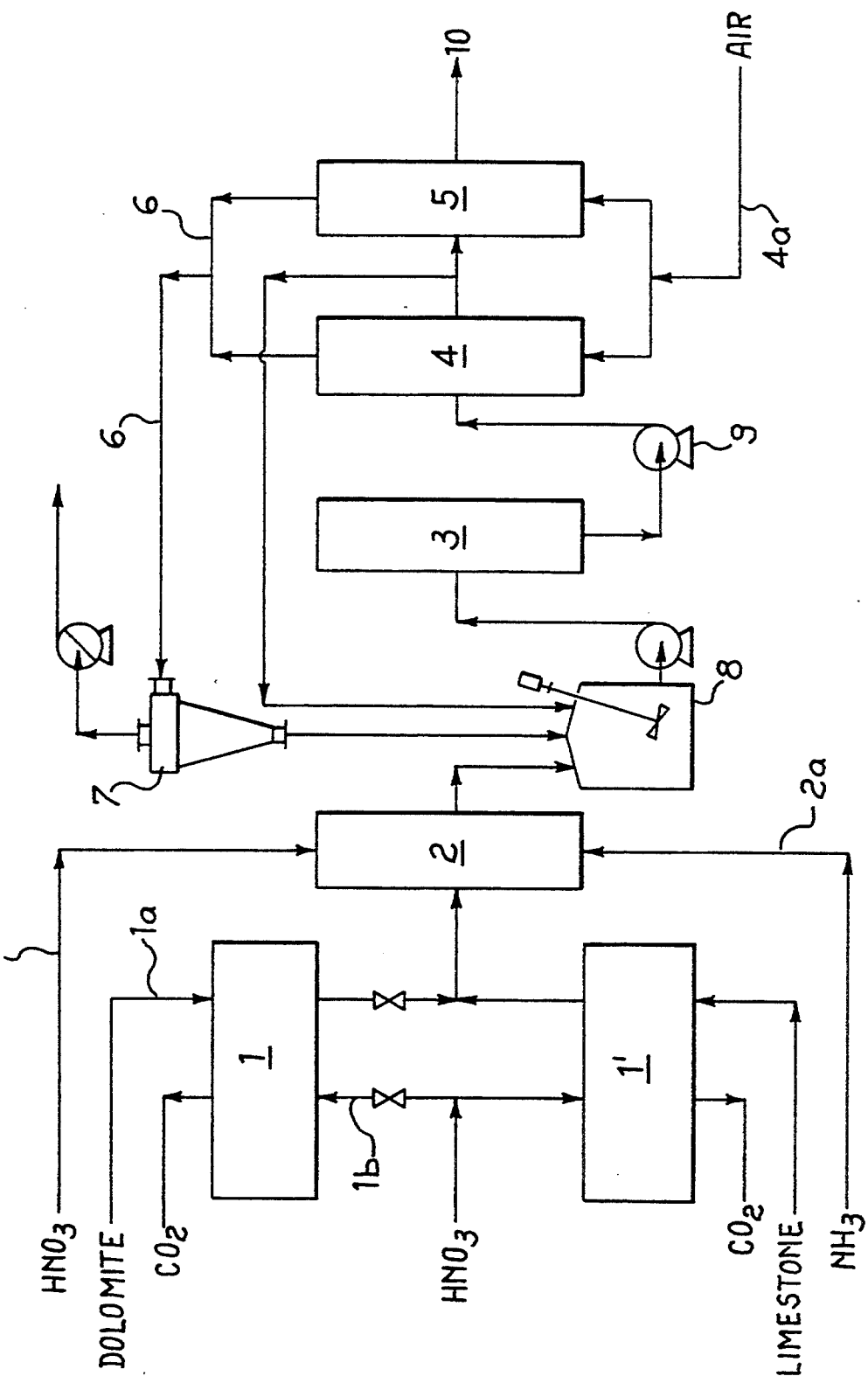
FIG. 1 is a block diagram of an equipment according to the present invention.

In the process according to the invention, the mineral is treated with nitric acid at the usual 54% concentration and a liquid solution of calcium and magnesium nitrate is obtained at a saline concentration around 56% and at a temperature ranging between 45 and 65 degrees C. Said reaction is performed in a stainless steel tower 1, fed from the top along the duct 1a with the mineral and from the bottom with nitric acid along the duct 1b.

If necessary, according to the required Ca content in the finished product (see example 2), a similar treatment with nitric acid is carried out on limestone or similar $CaCO_3$ based mineral in a second reactor, or tower, 1' and this second solution is added to that obtained in the reactor 1 for their subsequent treatment in the reactor 2 where the solution is neutralized in case its pH, after acid attack of phase 1, is lower than 4.5.

By neutralization it is meant that the pH of the neutralized solution is ranging in the interval between 4.5 and 7.5, preferably the solution pH ranges between 4.5 and 6.0.

It is also possible to add limestone to dolomite before or during the acid treatment.

Preferably, in order to increase the nitrogen content of the final product, nitric acid and ammonia, preferably anhydrous, are introduced into the neutralizer 2 along ducts 2a and 2b respectively. In this way the initial solution is added with $NH_4 NO_3$ in such amounts as to obtain an ammonium nitrate concentration in the finished products ranging between 0 (no addition) and 10%, by weight.

Then the neutral solution, at a temperature between 45 and 80 degrees C, is conveyed to concentration (3) where the water content is reduced to a value ranging between 15% and 35% in weight. The concentrator 3 is kept at a pressure below the atmospheric one, so as to evaporate water at relatively low temperatures and reach within short time the water content required to obtain the highest melting point of the solid product.

This stage of the process is essential to be in position to obtain a final product with a sufficiently high melting point and therefore with hardness and physical properties (absence of powders) such as to have a commercially valuable product.

Figure 2:
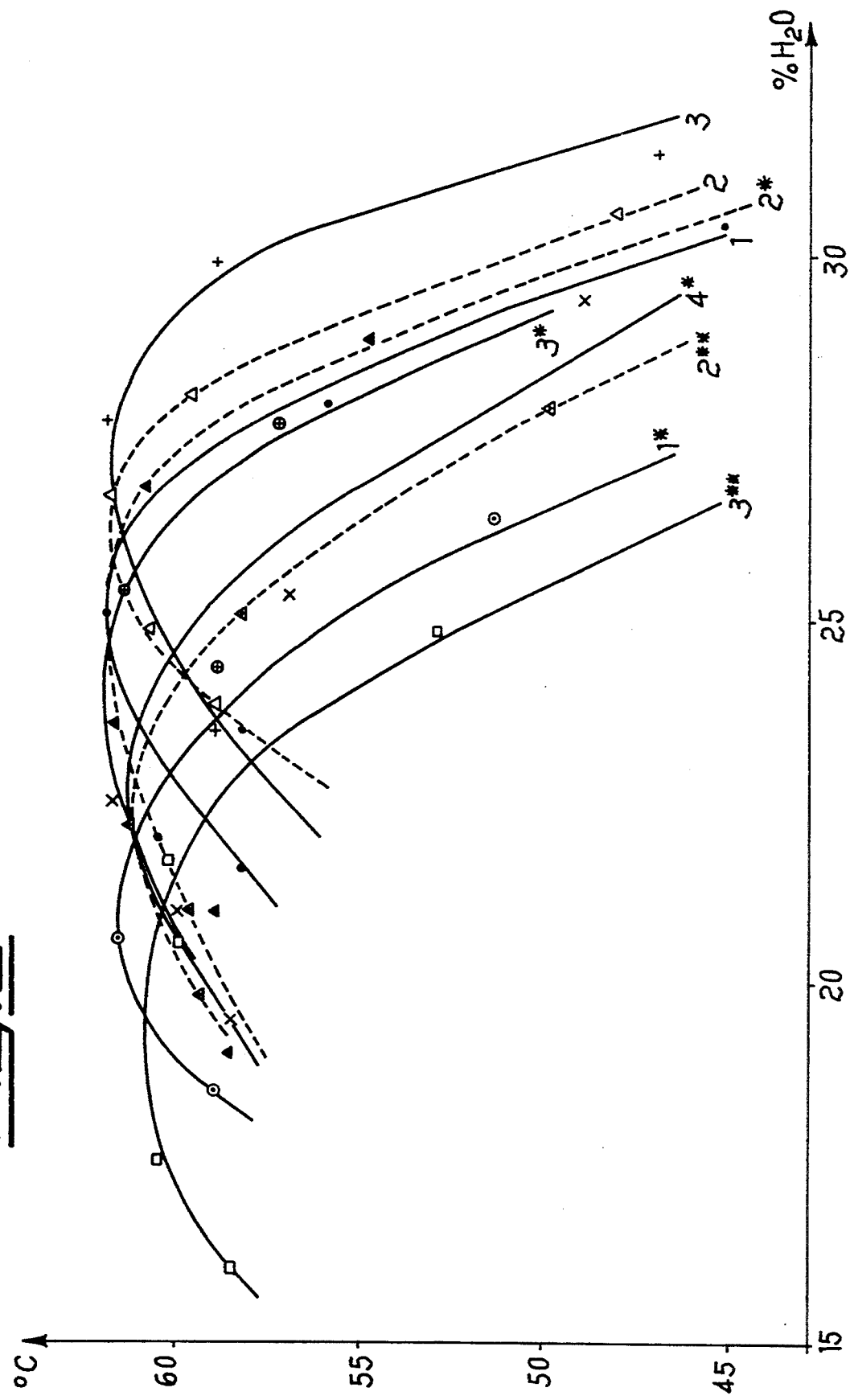
FIG. 2 is a graph of the reel ting points of different products according to the invention.

FIG. 2 shows the course of the melting point curve as a function of the water content in examples of mixtures (final products) according to the invention.

The composition of these mixtures in weight is as follows:

| | |
|---|---|
| Tot N | 13.5–16.0% |
| Amm N | 0.5–2.0% |
| $Ca(NO_3)_2$ | 44.5–55.0% |
| $Mg(NO_3)_2$ | 16.0–21.5% |
| MgO | 4–6% |
| $NH_4NO_3$ | 3.5–10.0% |
| $H_2O$ q.s. to | 100% |

Preferably the final mixtures according to the invention comprise at least 13% of total nitrogen and at least 5% of magnesium expressed as soluble MgO.

The optimal composition, as for $H_2O$ content, of the final products can be checked by means of differential thermal analysis: in fact well defined melting points are obtained with a single major peak.

In the final stage the concentrated hot solution is cooled and solidified in atmosphere with controlled and adjustable hygrometric degree with the purpose of preserving the physical characteristics obtainable thanks to the previous concentration at the desired water percentage.

The solid product can be obtained in the requested size in any way known in the technique, for example by means of a traditional flaking machine.

In the preferential embodiment to which FIG. 1 refers, the cooling-solidifying operation is performed in a granulator 4, of a type known in the technique. Namely, the solution is sprayed by means of nozzles in a rotary agglomerating drum arranged with slanting generating line versus the horizontal one. The drum is provided with a system known per se that allows rotation about the axis. On the internal surface there are positioned devices allowing to obtain a curtain of granules that, reached by the dispersed solution of hot product sprayed by means of nozzles, begin to grow in an "onion peel" way avoiding the possible phenomenon of undercooling. Inside the drum there are arranged the spraying nozzles, with or without air or other inert gas, that allow the adjustment and control of the size and shape of the small drops and the spray cone as a whole.

The drum inclination imparts a helicoidal motion to the flow of solid particles, with outlet in the bottom section of the drum itself.

Heat freed by the forming granules is eliminated thanks to an air flow that flows through granulator 4 and is fed thereto by means of the duct 4a. The temperature of said cooling air is generally ranging between 40 and 0 degrees C in a way that the temperature of the granules going out from the granulation drum is below approximately 45 degrees C. The air hygrometric degree is controlled and kept below 35% (referred to 20 degrees C). The preferential temperature is 4–10 degrees C to avoid the condensate freezing in the heat exchanger; moisture at this temperature corresponds to saturated air at 4 degrees C (dew point at 4 degrees C).

In order to improve the effectiveness of granulation, a fluid bed 5 can also be used, positioned for example inside the granulator or serially thereto and fed with air having the aforedescribed characteristics.

The granular product, with high properties of hardness and free from the tendency to release powders, can be furtherly cooled and, still under the same conditions of dry air, be conveyed to bag-filling 10 before storage.

As it can be observed in the accompanying figure, granulator 4 and fluid bed 5 are provided with outlet ducts 6 that come out in an eddy chamber 7 for powders separation. Powders thus recovered are conveyed to the mixer-dissolver 8 where they are incorporated into the solution coming from the neutralizer 2.

By means of the present invention optimal physical characteristics of granules are obtained by acting on its water content: in fact it has been amazingly noted that with a determined water percentage (water of crystallization), ranging between the aforementioned limits, it is possible to obtain granules with the highest melting point (50:65 degrees C) and with outstanding physical properties, whereas at the same time the operation of granulation takes place without formation of agglomerated masses.

The following test examples are illustrative and not limiting of the scope of the present invention and they simultaneously show the application field therof.

Example 1

To Obtain 1T of Granular Product Containing 9.4% OF MgO and 13.6% of Nitrogen

Raw materials:

Dolomite ($MgCO_3$=45% w/w, CaCO=52% w/w)
Nitric acid 50% w/w)
Ammonia (anhydrous)

a) In the stainless steel tower (1) dolomite (437 kg) is reacted with 54% nitric acid (1074 kg). 1285 kg of saline solution at a concentration of about 56% and at the temperature of approximately 50 degrees C and a gaseous effluent, consisting of carbon hydroxide formed in the reaction, saturated with steam, are obtained.

b) The solution is conveyed to the neutralizer (2): about 32 kg of 54% nitric acid are introduced and neutralized with approximately 4.6 kg of ammonia (neutralization is monitored by means of pH-meter).

c) The solution, added with ammonium nitrate in the previous operation, is conveyed to concentrator 3 kept at a pressure of about 0.285 Ata; when the solution reaches a temperature of about 123 degrees C it is ready to be conveyed to the granulator (4) by means of pump 9.

d) A flow of dry air (dew point= +4 degrees C) is fed into granulator 4 at a temperature of about 10 degrees C with such a flowrate as to cool the produced granules down to approximately 40 degrees C. Further cooling, before bag-filling, is carried out in a fluid bed (5), fed with air having the aforesaid characteristics, so as to reach a temperature of about 25 degrees C.

| CHARACTERISTICS OF THE FINISHED PRODUCT | |
|---|---|
| Chemical | |
| Total nitrogen = | 13.6% by weight |
| Ammonia nitrogen = | 0.4% by weight |
| Soluble CaO = | 12.7% by weight |
| Soluble MgO = | 9.4% by weight |
| $H_2O$ = | 26% by weight |
| Physical | |
| Diam. of granules = | 2:4 mm |

| CHARACTERISTICS OF THE FINISHED PRODUCT | |
|---|---|
| Hardness granule 3 mm = | about 7000 g |
| Critical moisture (25 degrees C.) = | 30% |
| Melting point = | about 60 degrees C. |
| Melting heat = | about 17 cal/g |

Example 2

To Obtain 1T of Granular Product Containing 5.2% of MgO and 15.5% of Nitrogen

Raw materials:
Dolomite ($MgCO=44\%$ w/w $CaCO=56\%$ w/w)
Limestone ($CaCO=$ about 100% w/w)
Nitric acid (54% w/w)
Ammonia (anhydrous)

a) In the stainless steel tower (1) dolomite (246 kg) is reacted with 54% nitric acid (622 kg) to obtain a solution (750 kg) with saline concentration of about 55.5% and at a temperature of approximately 50 degrees C. In tower 1' limestone (kg 173) is reacted with 54% nitric acid (404 kg) to obtain a solution (500 kg) at a saline concentration of about 57% and at approximately 50 degrees C.

b) The two solutions thus obtained are conveyed to neutralizer 2 where 54% nitric acid (150 kg) is introduced and under the control of a pH-meter is neutralized with ammonia (22 kg). A solution (1354 kg at about 80 degrees C) is obtained having the following composition:

$Ca(NO_3)=37.6\%$ w
$NH_4 NO_3=7.6\%$ w
$Mg(NO3)2=14.0\%$ w
$H_2O=40.7\%$ w c) The neutral solution is conveyed to concentrator 3 where, operating at a pressure of about 0.5 Ata, it reaches the optimal content of $H_2O$ when the temperature goes up to about 130 degrees C.

d) The concentrated solution is conveyed to the spraying bar of granulator 4 that is cooled inside by an air flow (saturated at 4 degrees C) at the temperature of about 10 degrees C. The amount of cooling air is such as to bring the temperature of the granules outgoing from the drum around 40 degrees C. Then granules undergo further cooling in a fluid bed (5), fed with air having the aforesaid characteristics, so as to reach a temperature of about 25 degrees C.

| CHARACTERISTICS OF THE FINISHED PRODUCT | |
|---|---|
| Chemical | |
| Total nitrogen = | 15.5% by weight |
| Ammonia nitrogen = | 1.8% by weight |
| Soluble CaO = | 17.4% by weight |
| Soluble MgO = | 5.2% by weight |
| $H_2O$ = | 20% by weight |
| Physical | |
| Diam. granules = | 2:4 mm |

| CHARACTERISTICS OF THE FINISHED PRODUCT | |
|---|---|
| Hardness granule 3 mm = | 4000 g |
| Critical moisture (25 degrees C.) = | about 20% |
| Melting point = | about 60 degrees C. |
| Melting heat = | about 15 cal/g |
| Solubility in $H_2O$ (30 degrees C.) | about 65% by weight |

I claim:

1. A process for producing a calcium- and magnesium-based fertilizer containing about 13.5–16.0% by weight total nitrogen, which has a water content of from about 15 to 35% by weight and a melting point of from 50° to 65° C., comprising the steps of:
   (a) preparing an aqueous solution containing about 44.5–55.0% by weight calcium nitrate and about 16.0–21.5% by weight magnesium nitrate by treating an inorganic material containing calcium and magnesium with nitric acid;
   (b) adjusting the pH of the aqueous solution to a pH between 4.5 and 7.5;
   (c) concentrating the aqueous solution to the total water content of from about 15 to 35% by weight; and
   (d) solidifying the concentrated aqueous solution by cooling in an atmosphere having a controlled moisture content.

2. A process according to claim 1, wherein the fertilizer is a calcium-, magnesium-, and ammonium-based fertilizer containing additionally about 0.5–2.0% by weight ammonium nitrogen, further comprising the step of introducing about 3.5–10.0% by weight ammonium nitrate into the solution by adding nitric acid and ammonia to the solution during the step of adjusting the pH.

3. A process according to claim 2, wherein said inorganic material to be treated with nitric acid is dolomite or mixtures of dolomite and limestone.

4. A nitrogen-containing fertilizer prepared by the process of claim 2.

5. A nitrogen-containing fertilizer according to claim 4, wherein the fertilizer is granular.

6. A process according to claim 2, wherein the pH is from 4.5–6.0.

7. A process according to claim 1, wherein said concentrated solution is solidified by cooling in a flow of air or another gas having a temperature of between 0° and 40° C. and moisture content of below 35% at 20° C.

8. A process according to claim 7, wherein said solution is simultaneously cooled and solidified in a granulator.

9. A process according to claim 1, wherein said concentrating of said solution is carried out at a pressure below atmospheric pressure.

10. A nitrogen-containing fertilizer prepared by the process according to claim 1.

11. A nitrogen-containing fertilizer according to claim 10, wherein the fertilizer is granular.

12. A process according to claim 1, wherein the pH is from 4.5–6.0.

* * * * *